United States Patent
Nakagawa

(10) Patent No.: US 8,585,267 B2
(45) Date of Patent: Nov. 19, 2013

(54) HEAD LAMP ATTACHMENT STRUCTURE

(75) Inventor: Keiichi Nakagawa, Saitama (JP)

(73) Assignee: Calsonic Kansei Corporation, Saitama-shi (JP)

(*) Notice: Subject to any disclaimer, the term of this patent is extended or adjusted under 35 U.S.C. 154(b) by 551 days.

(21) Appl. No.: 12/809,495

(22) PCT Filed: Dec. 2, 2008

(86) PCT No.: PCT/JP2008/071837
§ 371 (c)(1),
(2), (4) Date: Jun. 18, 2010

(87) PCT Pub. No.: WO2009/081694
PCT Pub. Date: Jul. 2, 2009

(65) Prior Publication Data
US 2010/0277942 A1    Nov. 4, 2010

(30) Foreign Application Priority Data
Dec. 21, 2007  (JP) ................. 2007-329905

(51) Int. Cl.
*F21V 33/00* (2006.01)

(52) U.S. Cl.
USPC .............. 362/549; 362/502; 362/507

(58) Field of Classification Search
USPC ......... 362/496, 502, 504, 506, 507, 523, 531, 362/549, 457, 458
See application file for complete search history.

(56) References Cited

U.S. PATENT DOCUMENTS

| 5,154,505 A * | 10/1992 | Sasamoto ............. 362/549 |
| 6,997,585 B2 | 2/2006 | Ito |
| 7,338,191 B2 | 3/2008 | Konno et al. |
| 7,891,850 B2 * | 2/2011 | Breisacher ............. 362/506 |
| 2004/0156208 A1 | 8/2004 | Ito |
| 2004/0264203 A1 | 12/2004 | Konno et al. |

FOREIGN PATENT DOCUMENTS

| JP | 62-168947 U | 10/1987 |
| JP | 2000-335336 A | 12/2000 |
| JP | 2002-079877 A | 3/2002 |
| JP | 2003-267123 A | 9/2003 |
| JP | 2004-207061 A | 7/2004 |
| JP | 2004-351959 A | 12/2004 |
| JP | 2005-014665 A | 1/2005 |
| JP | 2007-126021 A | 5/2007 |

* cited by examiner

Primary Examiner — Y My Quach Lee
(74) Attorney, Agent, or Firm — Foley & Lardner LLP

(57) ABSTRACT

A head lamp attachment structure includes projecting portions 30 that are projected from the head lamps 2, and receiving parts 15 that are provided on a radiator core support 1 and have guide grooves 16. After the head lamps 2 are moved backward of a vehicle along a predetermined trajectory by being slid along the guide grooves 16, the projecting portions 30 are disengaged backward out of the guide grooves 16 of the receiving parts 15 in such a way that the head lamps 2 are fixed on a vehicle body in a state where a certain clearance H1 is formed below the projecting portions 30.

4 Claims, 6 Drawing Sheets

FIG. 7
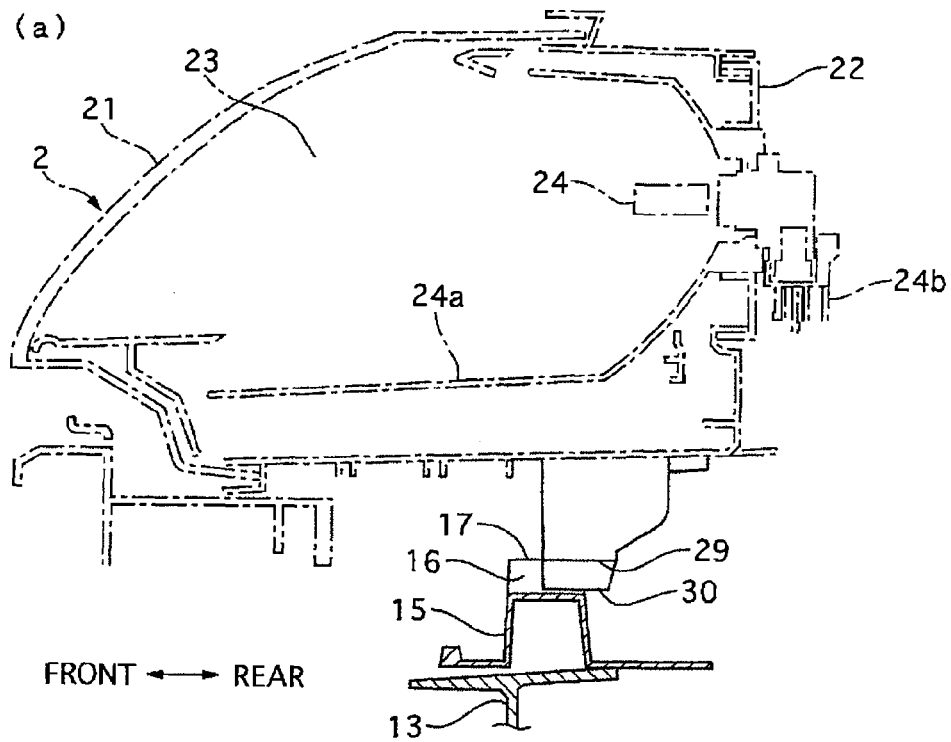
(a)
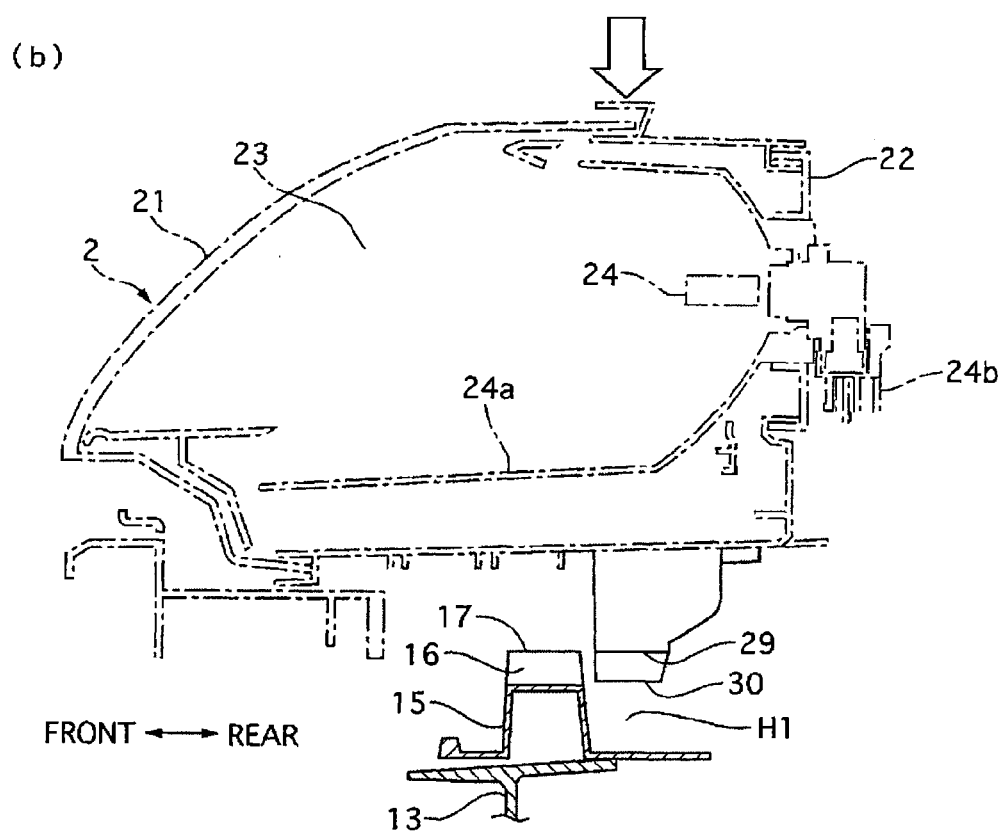
(b)

HEAD LAMP ATTACHMENT STRUCTURE

TECHNICAL FIELD

The present invention relates to a head lamp attachment structure for vehicles and others.

BACKGROUND OF THE INVENTION

A prior front end module is constructed such that peripheral parts such as head lamps are prepared and mounted on the front end module, and then the front end module is assembled with a front part of a vehicle body in a vehicle assembly line for the purpose of automation of assembly works of vehicle bodies and reduction in assembly processes thereof, as disclosed in Japanese Patent Application Laid Open Publication No. 2007-126021A. In such a front end module, in order to fix the head lamps to the vehicle body with a high degree of accuracy, regardless of assembly accuracy of the vehicle body and a radiator core support, the head lamps are temporally fixed to the radiator core support at front side positions relative to their normal positions, and then the head lamps are moved backward and fixed to the vehicle body after the radiator core support is assembled with the vehicle body. On the other hand, recently a technology for absorbing an impact force became known. It teaches impact force absorption by moving down a head lamp in a case where an impact force is inputted from above of the head lamp at the time of crash, as disclosed in Japanese Patent Application Laid-Open Publication No. 2004-207061.

DISCLOSURE OF THE INVENTION

Problem(s) to be Solved by the Invention

The above prior inventions, however, have the following problem. When the head lamps are moved backward of the motor vehicle after their temporary fixation, it needs to move the head lamps along a predetermined trajectory in order to avoid contact of the head lamps and the peripheral parts and position deviation thereof. It takes a lot of trouble with attachment and detachment of a jig in a case where the head lamps are moved, being guided by using the jig.

On the other hand, in a case where jig portion are integrally provided with the radiator core support to remove the attachment and detachment operation of the jig, the head lamps are supported from below by the jig portions, which may cause reaction force against the impact force to become larger and degenerate its impact absorption performance when the impact force is inputted from above of the head lamps at the time of crash.

The present invention is made to solve the above-described problem, and its object is to provide a head lamp attachment structure which can fix a head lamp to a vehicle body with a high degree of accuracy, regardless of assembly accuracy of the vehicle body and a radiator core support, and without an attachment and detachment operation of a jig, being able to prevent reduction in an impact absorption performance against an input from above at the time of crash.

Means for Solving the Problems

According to an aspect of the present invention there is provided a head lamp attachment structure in which a head lamp of a motor vehicle is temporally assembled with a radiator core support comprising a front end module at a front side position relative to a normal position thereof, and then the radiator core support and a vehicle body are assembled with each other, and then the head lamp is moved backward to be fixed to the vehicle body. The structure includes a projecting portion that projects from the head lamp, and a receiving part that is provided on the radiator core support and has a guide groove. The projecting portion of the head lamp is moved backward by being slid along the guide groove after the radiator core support temporally assembled with the head lamp and the vehicle body are assembled with each other, and then the projecting portion is disengaged backward from the guide groove of the receiving part so that the head lamp is fixed to the vehicle body in a state wherein a certain clearance is formed under the projecting portion and the projecting portion is apart from the radiator core support.

Effect of the Invention

In the head lamp attachment structure of the present invention, the head lamp of the motor vehicle is fixed to the radiator core support comprising the front end module at the front side position relative to the normal position thereof.

Then, the projecting portion of the head lamp is moved backward along the predetermined trajectory by being slid along the guide groove of the receiving part after the radiator core support is fixed to the vehicle body. This enables the head lamp to move without contact with the peripheral parts.

Further, the projecting portion is disengaged backward of the motor vehicle from the guide groove of the receiving part so that the head lamp is fixed on the vehicle body in the state where the certain clearance is formed under the projecting portion. Therefore, the head lamp can be fixed to the vehicle body with a high degree of accuracy, regardless of assembly accuracy of the radiator core support and the vehicle body, and without an attachment and detachment operation of a jig. In addition, it can prevent reduction in an impact absorption performance against an input from above of the head lamp at the time of a crash.

BRIEF DESCRIPTION OF THE DRAWINGS

FIG. 7 is a view, taken along S7-S7 line of FIG. 2, explaining a positional relationship between the head lamp and the vehicle body before and after the head lamp is fixed to the vehicle body.

Figure 1:
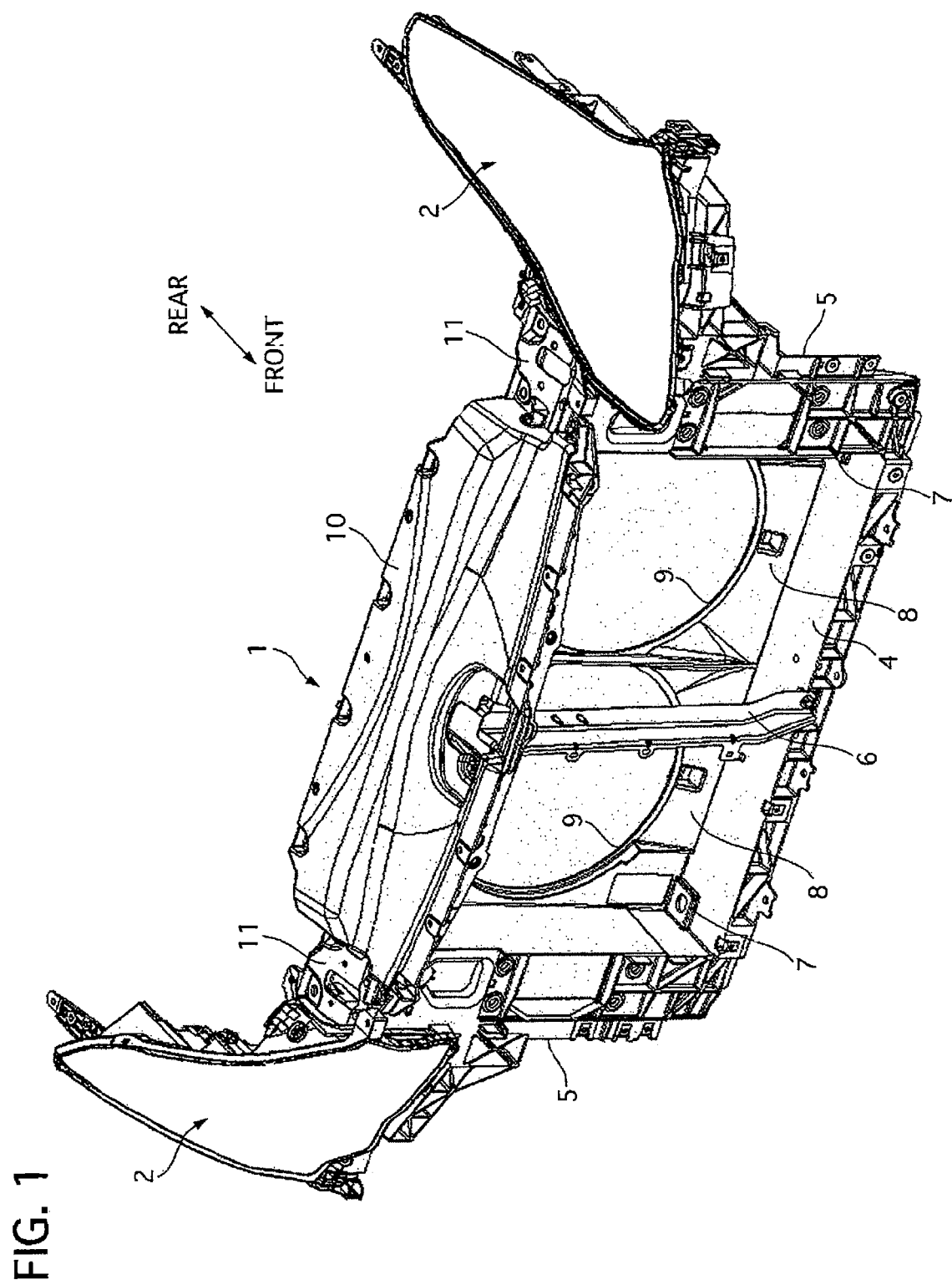
FIG. 1 is a perspective view showing an entirety of a radiator core support, provided with head lamps, of a first embodiment of the present invention.

DESCRIPTION OF REFERENCE NUMBERS 1 radiator core support
2 head lamp
3 radiator core upper support
4 radiator core lower support
5 radiator core side support
5a, 5b, 5c, 5d fixing portion 5e side member attachment portion
6 hood lock stay
7 fixing portion
8 fan shroud portion
9 fan opening portion
10 cover member
11 bracket
12 hexagon cap nut
13 head lamp stay
14 hexagon cap nut
15 receiving part
15a fastening member
16 guide groove
17 support portion
18 throughout hole
19 hexagon cap nut
21 outer lens
22 housing
23 lamp chamber
24 bulb
24a reflector
24b connector
25, 26, 27 fixing portion
28 hexagon cap nut
29 stepped portion
30 projecting portion
31 pin

BEST MODE FOR CARRYING OUT THE INVENTION

Hereinafter, an embodiment according to the present invention will be described with reference to the accompanied drawings.

First Embodiment

Hereinafter, a head lamp attachment structure of a first embodiment will be explained.

Incidentally, a longitudinal direction and a lateral direction of a vehicle body will be termed as a front and rear direction and a left and right direction, respectively.

Figure 2:
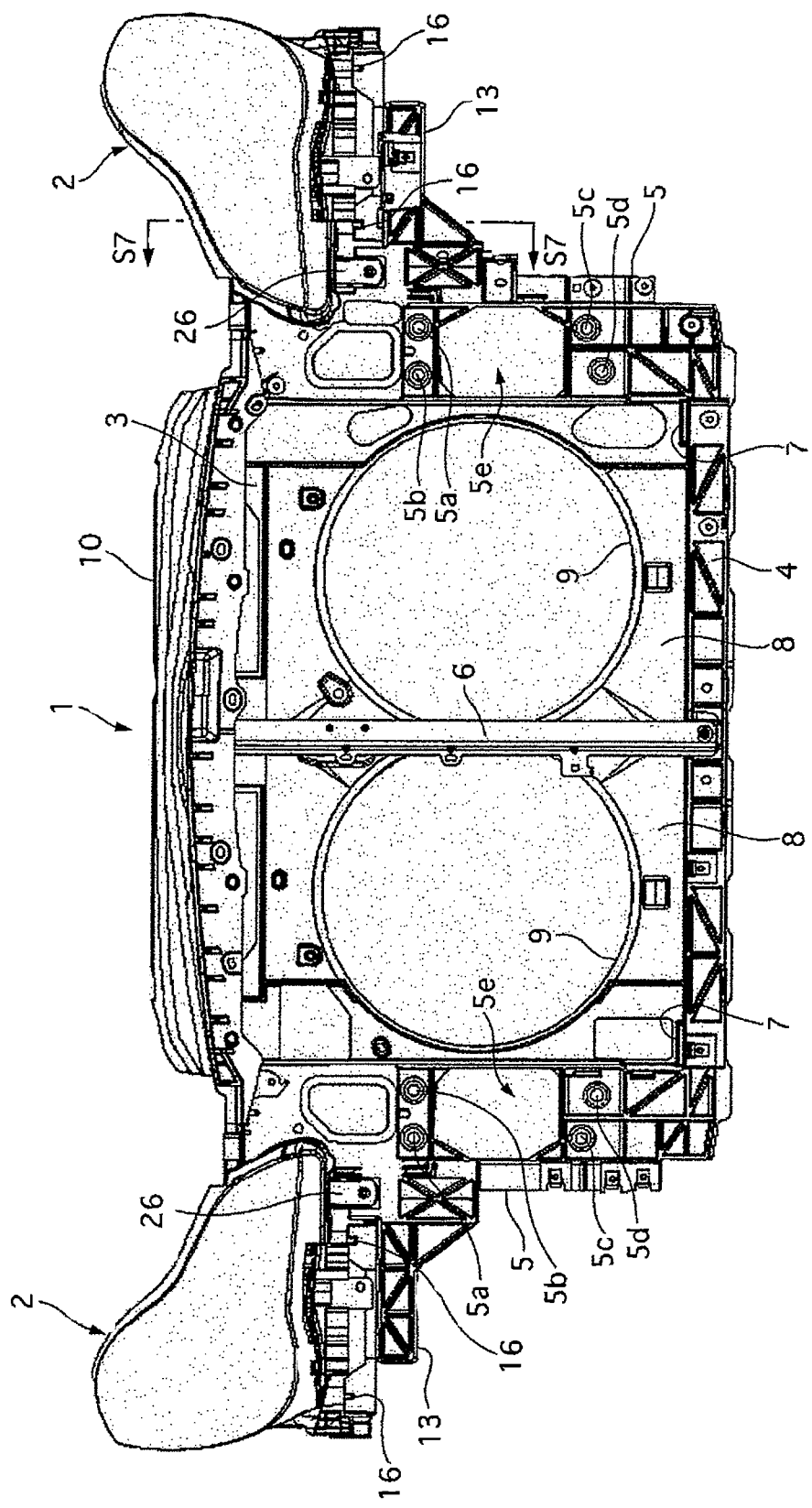
FIG. 2 is a front view showing the radiator core support with the head lamps of the first embodiment.

As shown in FIG. 1 and FIG. 2, in the first embodiment of the invention, there are provided a radiator core support 1 and head lamps 2 that are mounted on a left portion and a right portion of the radiator core support 1, respectively.

The radiator core support 1 has a radiator core upper support 3, a radiator core lower support 4 and radiator core side supports 5, where the radiator core upper support 3 extends in the left and right direction, the radiator core lower support 4 is arranged parallel to the radiator core upper support 3, and the radiator core side supports 5 connect the both end portions of the radiator core upper support 3 and the radiator core lower support 4, respectively. These supports are formed of elastic material as one unit.

In addition, central portions of the radiator core upper support 3 and the radiator core lower support 4 are connected with each other by using a hood lock stay 6 that is made of metal material.

The radiator core upper support 3 is formed at the left and right end portions thereof with not-shown fixing portions to fix not-shown vehicle-mounting pins formed on the upper portion of a heat exchanger, where the fixing portions are used for mounting the heat exchanger on the vehicle body through brackets and insulators. The radiator core lower support 4 is formed at the left and right end portions thereof with fixing portions 7 of the lower portion of the heat exchanger, where the fixing portions 7 are used for mounting the heat exchanger on the vehicle body through insulators.

Further, at the inner sides of the radiator core upper support 3, the radiator core lower support 4, the radiator core side supports 5 and the hood lock stay 6, a fan shroud portion 8 is formed therewith as one unit. The fan shroud portion 8 is formed to have two fan opening portions 9, each of which is formed like a round shape, so as to face not-shown two fans to the heat exchanger from a rear side.

Figure 3:
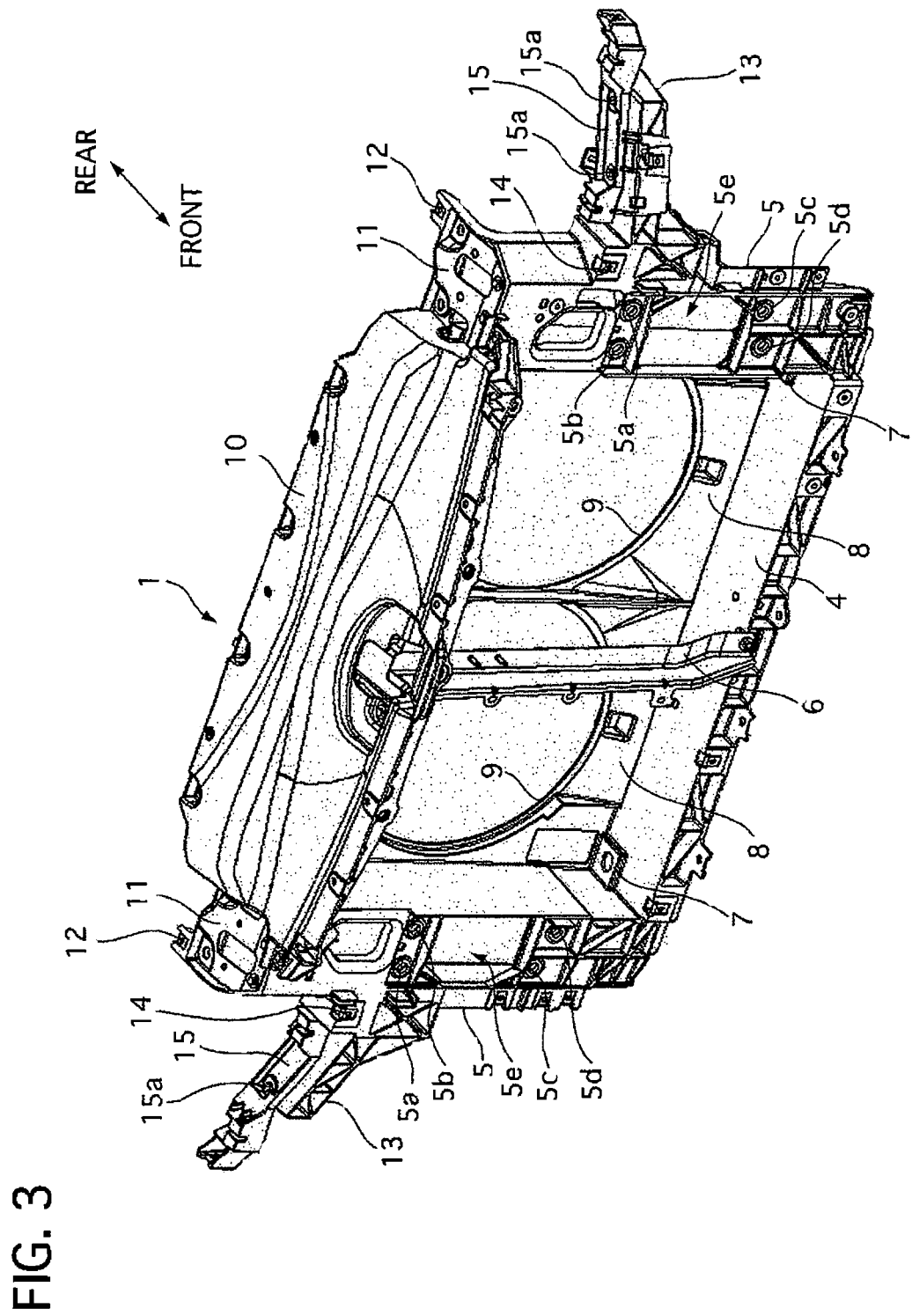
FIG. 3 is a perspective view showing the entirety of the radiator core support of the first embodiment.

A cover member 10 is made of plastic material and it is attached on an upper portion of the radiator core upper support 3, extending in the left and right direction as shown in FIG. 3.

A metal bracket 11 is attached on a top portion of each radiator core side support 5, to which hexagon cap nuts are loosely fastened. The hexagon cap nuts have a screw hole that opens in an upward and downward direction, near each bracket 11.

Further, an intermediate portion of each radiator core side support 5 is provided with a side member attachment part 5e that has fixing portions 5a to 5d so that a not-shown bumper stay is fixed thereon from its front side and a not-shown side member of the vehicle body is fixed thereon from its rear side.

Further, each radiator core side support 5 is formed with a head lamp stay 13, which extends outwardly near the side member fixing part 5, as one unit. In addition, a head lamp 2 is temporally fixed on the head lamp stay 13.

Further, a hexagon cap nut 14, which is a screw hole opening in the front and back direction, is loosely fastened to a connected portion of each radiator core side support 5 and the head lamp stay 13.

Hereinafter, only the right radiator core side support 5 and head lamp 2 will be described in detail, because the head lamps 2 that are mounted on the left side portion and the right side portion of the radiator core support 1 produce a symmetrical appearance.

As shown in FIG. 3, a receiving part 15, which is made of plastic material, is fixed on an upper surface of each radiator core side member 5 by using fastening members 15a that are apart from each other in the left and right direction.

Figure 4:
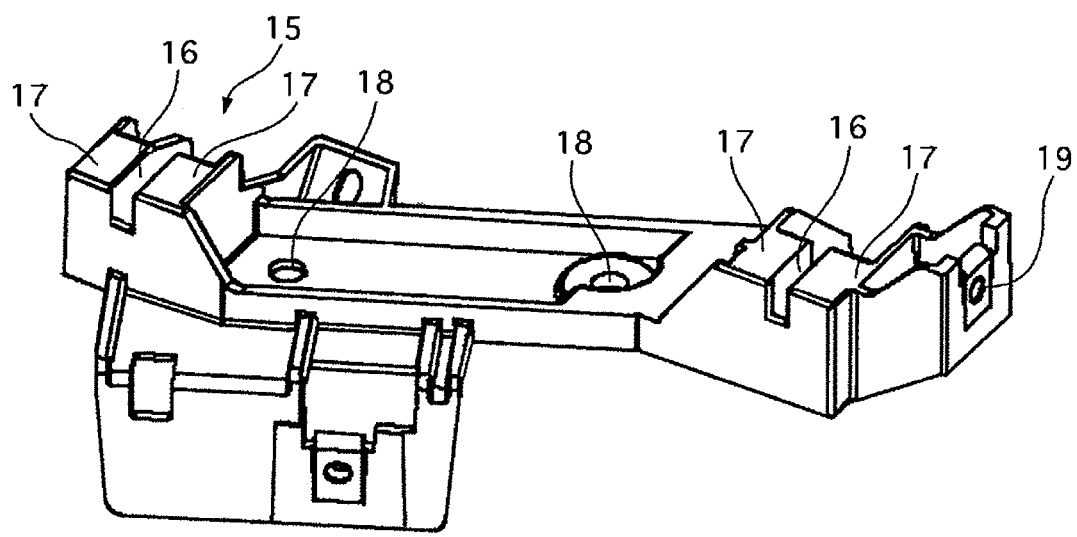
FIG. 4 is an enlarged perspective view showing a receiving portion of the first embodiment.

As shown in FIG. 4, the receiving part 15 is formed with a guide groove 16, which runs through in the front and back direction, opening upward. Supporting portions 17 with a flat surface are formed at the both sides of each guide groove 16.

Further, between the guide grooves 16, throughout holes 18 are formed to be insertable by the fastening members 15a from above. In addition, the hexagon cap nuts 19, which open in the left and right direction, are loosely fastened to the end portions of the receiving parts 15, respectively.

Figure 5:
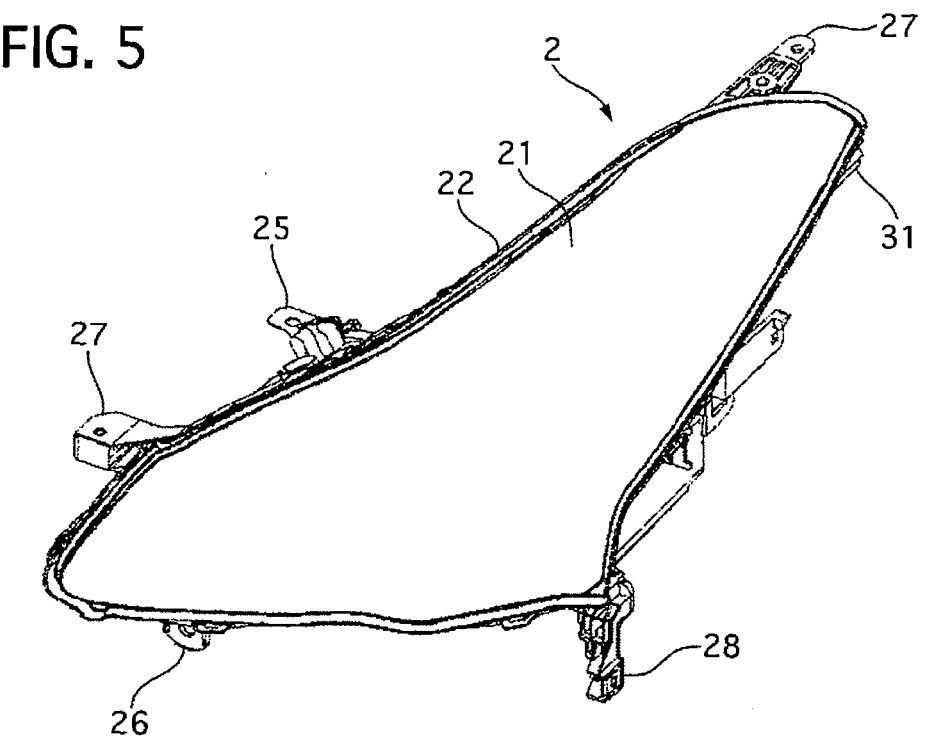
FIG. 5 is a perspective view of the head lamp of the first embodiment, seen from a front side of a vehicle body.
Figure 6:
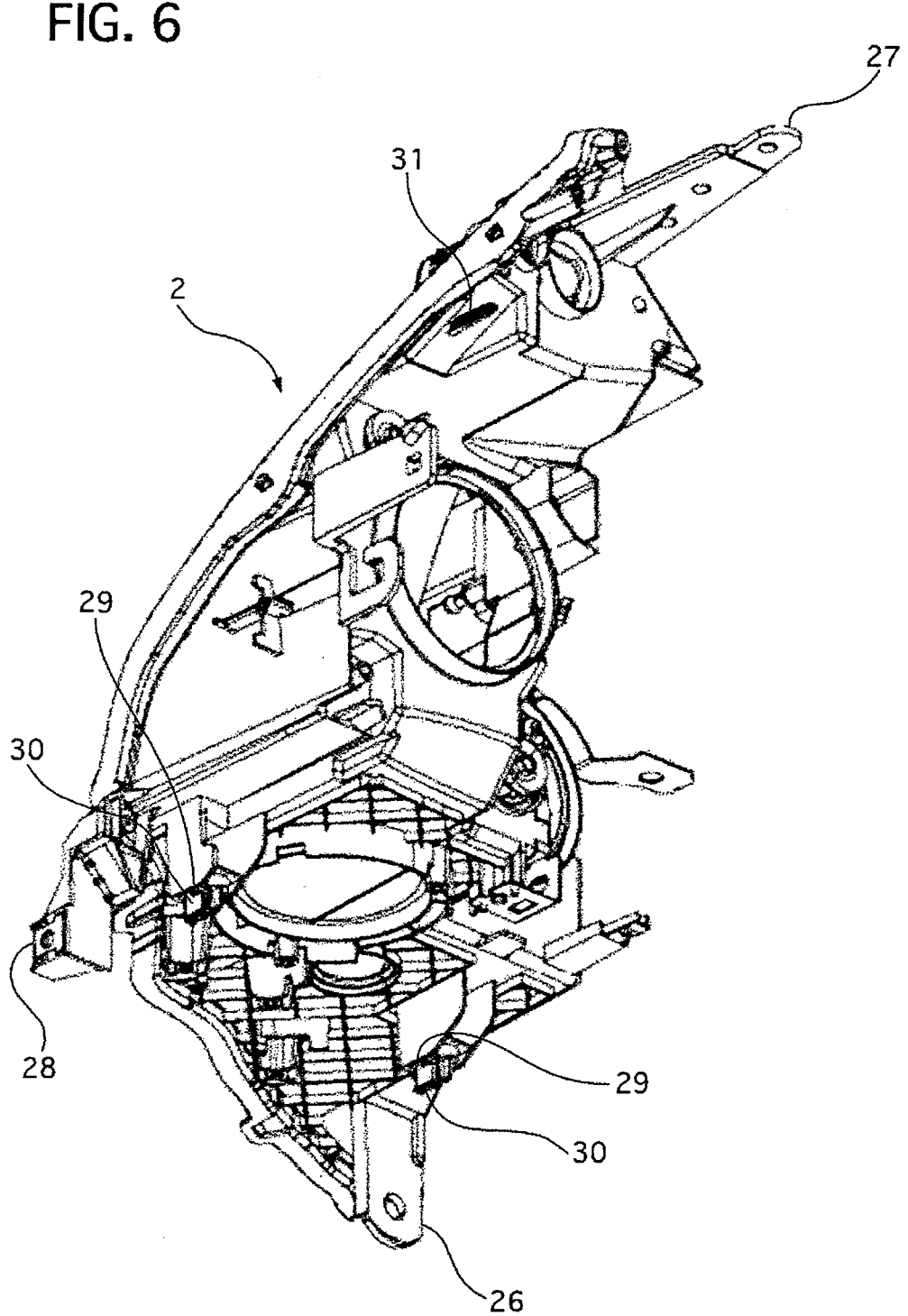
FIG. 6 is a perspective view showing the head lamp of the first head lamp, seen from an obliquely down side thereof, where a part thereof is omitted.

On the other hand, as shown in FIG. 5 to FIG. 7, each head lamp 2 is formed to have a lamp chamber 23 in the interior surrounded by an outer lens 21 and a housing 22, and the lamp chamber 23 contains a bulb 24, a reflector 24a and others.

Further, the head lamp 2 is provided with a fixing portion 25 and another fixing portion 26, where the fixing portion 25 is formed like a plate that has an insertion hole at a position corresponding to the hexagon cap nut 12, and the fixing portion 26 is formed like a plate that has an insertion hole at a position corresponding to the hexagon cap nut 26.

Further, the head lamp 2 is provided at the front side and the rear side thereof with fixing portions 27, which have an insertion hole opening in the upward and downward direction and functioning as a fixing portion to the vehicle body. The hexagon cap nut 28 that opens in the left and right direction is loosely fastened to the head lamp 2.

Further, as shown in FIG. 6 and FIG. 7, projecting portions 30 have a stepped portion 29, and they are provided on a bottom surface of the head lamp 2, being apart from each other in the left and right direction.

Further, as shown in FIG. 5 and FIG. 6, a pin 31 is provided on a rear surface of the head lamp 2, being projected backward. Incidentally, the pin 31 corresponds to an engaging means of the present invention.

Next, the operation of the first embodiment will be described.

<As to Temporal Fixation of the Head Lamps and the Radiator Core Support>

When the head lamps 2 are temporally fixed on the radiator core support 1, first, not-shown fastening members are inserted into the corresponding screw holes of the hexagon cap nuts 12 and 14 through the insertion holes of the fixing portions 25 and 26, respectively, in a state where the head lamps 2 are arranged above the head lamp stays 13.

Incidentally, the fastening members are loosely fastened, not fully tightened. In addition, a part of the head lamps 2 may be engaged with the radiator core support 1 or they may be temporally fixed with each other by using a jig, instead of the temporal fixation of the fastening members.

In this temporal fixation operation, as shown in FIG. 7(*a*), each projecting portion 30 is inserted into the guide groove 16 of the corresponding receiving part 15 from above, and they are engaged with each other, and the stepped portion 29 is placed on the supporting portion 17 of the receiving part so as to be supported from below. This enables the head lamps 2 to be temporally fixed on the radiator core support 1 in a stable state.

Next, a front end module is constructed in such a way that the peripheral parts, such as a heat exchanger, a motor fan and others except the head lamps 2, are mounted on the radiator core support 1, and then the module is conveyed to an assembly line of the vehicle body.

<As to Fixation of the Head Lamps and the Vehicle Body>

Next, in the assembly line of the vehicle body, the fixing portions 5*a* to 5*d* of each side member attachment member 5*e* of the radiator core support 1 are fastened on not-shown side members of the vehicle body by using not-shown fastening members, so that the radiator core support 1 is fixed on the front portion of the vehicle body.

In this fixation operation, there is formed some clearances between the rear surfaces of the head lamps 2 and the vehicle body, which enables a worker to easily perform the operation to connect connectors 24 of the bulbs 24, shown in FIG. 7, and others with not-shown vehicle-body side harnesses.

Next, as shown in FIG. 7(*b*), the projecting portions 30 of the head lamps 2 are moved backward, being slid along the guide grooves 16. After then, the projecting portions 30 are disengaged backward from the guide grooves 16 of the receiving parts 15 to form a certain clearances H1.

In this operation, as explained above, because the projecting portions 30 are engaged with the front portions of the receiving parts 15 in advance, so that the head lamps 2 can be easily moved backward, being slid in that state.

Further, the head lamps 2 can be moved backward along a predetermined trajectory by the projecting portions 30 of the head lamps 2 being slid in the guide grooves 16. This can avoid undesirable contact of the head lamps 2 and the peripheral members of the vehicle body, and position deviation thereof.

Further, the pins 31 are inserted into and engaged with not-shown engagement holes formed in the vehicle body right before they are disengaged from each other, so that head lamps 2 can maintain their proper attitudes, not moving downward out of their proper positions.

Next, the throughout holes of the fixing portions 27 and the screw holes of the hexagon cap nuts 28 are placed at the corresponding not-shown screw holes and throughout holes formed in the vehicle body, and then not-shown fastening members are inserted into and engaged with those holes to fix the head lamps 2 to the vehicle body.

In this fixing operation, the head lamps 2 can be fixed on the vehicle body with a high degree of accuracy, regardless of assembly accuracy of the radiator core support 1 and the vehicle body, because the hexagon cap nuts 12 and 14 are loosely engaged with the radiator core support 1.

Finally, the fastening members, which are respectively inserted into the corresponding hexagon cap nuts 12 and 14 through the throughout holes of the fixing portions 25 and 26 to be temporally fastened, are fully tightened to fix the head lamps 2 on the radiator core support 1. In addition, in this fixing operation, the throughout holes of the hexagon cap nuts 19 of the receiving parts 15 are placed at the not-shown corresponding throughout holes formed in the vehicle body, and, in this state, not-shown fastening members are inserted into and engaged with theses holes, which may be appropriately performed.

<As to Behavior at the Time of Crash>

In thus-constructed head lamp attachment structure, in a case where an impact is inputted from above as indicated by an arrow shown in FIG. 7(*b*) at the time of crash, it is desirable to move the head lamp/head lamps 2 downward as well known.

Accordingly, in the first embodiment, as described above, because the certain clearance H1 is formed under the projecting portion 30, the projecting portion 30 is disengaged backward out of the guide groove 16 of the receiving part 15 to allow the head lamp 2 to easily move downward, decreasing reaction force of the impact relative to that generated in a case where the projecting portion 30 is supported by the receiving part 15 from below. This can prevent reduction in an impact absorption performance.

Hereinafter, the effects of the first embodiment will be listed below.

As explained above, in the head lamp attachment structure of the first embodiment, the head lamps 2 are temporally assembled with the radiator core support 1, which comprises the front end module, at front side positions relative to normal positions thereof, and then the radiator core support 1 and the vehicle body are assembled with each other, and then the head lamps 2 are moved backward to be fixed to the vehicle body. The projecting portions are provided on the head lamps 2, and the receiving parts 15 are provided on the radiator core support 1 and have the guide grooves 16. The projecting portions 30 of the head lamps 2 are moved backward by being slid along the guide grooves 16 of the receiving parts 15, and then the projecting portions 30 are disengaged backward from the guide grooves 16 of the receiving parts 15 so that the head lamps 2 are fixed to the vehicle body in the state wherein the certain clearances H1 are formed under the projecting portions 30 and the projecting portions 30 are apart from the radiator core support 1. Therefore, the head lamps 2 can be easily fixed to the vehicle body with a high degree of accuracy, regardless of assembly accuracy of the radiator core support 1 and the vehicle body, and without a need for an attachment and detachment operation of a jig. In addition, it can prevent reduction in an impact absorption performance when an impact is inputted from above of the head lamps 2 at the time of a crash.

In addition, the projecting portions 30 are engaged with the guide grooves 16 of the receiving parts 15 in advance of the temporary assembly of the head lamp 2 and the radiator core support 1 at the vehicle-front side positions relative to their normal positions. Therefore, there is no need to engage the projecting portions 30 with the guide grooves 16 of the receiving parts 15 when the radiator core support 1 is fixed on the vehicle body. This enables the projecting portions 30 to easily slide along the guide grooves 16.

Further, the head lamps 2 are supported from below in the state where the projecting portions 30 are provided to project downward from the head lamps 2 and also engaged with the guide grooves 16 of the receiving parts 30 in advance, before the head lamps 2 are temporally assembled with the radiator core support 1 at the vehicle-front side positions relative to their normal positions. Therefore, the head lamps 2 can be temporally assembled with the radiator core support 1 in a stable state.

Further, the projecting portions 30 have the pins 31 that maintain the proper attitudes of the head lamps 2 right before the projecting portions 30 are disengaged backward out of the guide grooves 16 of the receiving parts 15. Therefore, a worker can perform the operation to fix the head lamps 2 on the vehicle body in stable attitudes of the head lamps 2.

While the embodiment has been explained, the present invention is not limited to the above-described embodiment, and design changes and modifications are included in the present invention as long as they do not depart from the subject-matter of the present invention.

For example, material to form the members and parts of the first embodiment may be appropriately chosen. For example, the material of the receiving parts 15 is not limited to plastic material, and an entire thereof may be formed of metal material, they may be formed partially of metal material by using resin molding, they may have projections and dents to be engaged with each other, or they may be formed with the head lamp stays 13 by using plastic material as one unit.

Further, configurations, positions for formation and the number of formation of the projecting portions 30 and the receiving parts 15 (with the guide grooves 16) may be set appropriately. For example, they may be arranged at a side of the head lamp 2.

The invention claimed is:

1. A head lamp attachment structure in which a head lamp of a motor vehicle is temporally assembled with a radiator core support comprising a front end module at a front side position relative to a normal position thereof, and then the radiator core support and a vehicle body are assembled with each other, and then the head lamp is moved backward to be fixed to the vehicle body, the structure comprising:
   a projecting portion that projects from the head lamp; and
   a receiving part that is provided on the radiator core support and has a guide groove, wherein
   the projecting portion of the head lamp is moved backward by being slid along the guide groove after the radiator core support temporally assembled with the head lamp and the vehicle body are assembled with each other, and then the projecting portion is disengaged backward from the guide groove of the receiving part so that the head lamp is fixed to the vehicle body in a state wherein a certain clearance is formed under the projecting portion and the projection portion is apart from the radiator core support.

2. The head lamp attachment structure according to claim 1, wherein
   the projecting portion is engaged with the guide groove of the receiving part in advance of when the head lamp is temporally fixed to the radiator core support at the front side position relative to the normal position.

3. The head lamp attachment structure according to claim 2, wherein
   the projecting portion is projected downward from the head lamp, and
   the head lamp is supported from below in a state wherein the projecting portion is engaged with the guide groove of the receiving part in advance of temporary fixation of the head lamp and the radiator core support at the front side position relative to the normal position.

4. The head lamp attachment structure according to claim 3, further comprising:
   an engaging means for maintaining an attitude of the head lamp just before the projecting portion is disengaged backward from the guide groove of the receiving part.

\* \* \* \* \*